United States Patent [19]

Yeheskel et al.

[11] Patent Number: 5,387,898
[45] Date of Patent: Feb. 7, 1995

[54] BRAKE LIGHTS ACTIVATION SYSTEM AND INERTIAL SIGNAL-GENERATING DEVICE THEREFOR

[75] Inventors: Menashe Yeheskel, Yavne; Armand Rosenberg, Rehovot, both of Israel

[73] Assignee: Baran Advanced Technologies (86) Ltd, Beer-Sheva, Israel

[21] Appl. No.: 837,330

[22] Filed: Feb. 18, 1992

[30] Foreign Application Priority Data

Mar. 1, 1991 [IL] Israel .................................. 97397
Oct. 23, 1991 [IL] Israel .................................. 99836
Nov. 29, 1991 [IL] Israel ................................. 100197

[51] Int. Cl.⁶ .............................................. B60Q 1/44
[52] U.S. Cl. ...................................... 340/479; 340/463; 340/467; 340/665; 310/329; 310/330
[58] Field of Search ............... 340/463, 464, 467, 479, 340/665, 666; 310/311, 312, 326–330

[56] References Cited

U.S. PATENT DOCUMENTS

| | | | |
|---|---|---|---|
| 3,501,742 | 3/1970 | Ellison | 340/467 |
| 3,659,260 | 4/1972 | St. Pierre | 340/467 |
| 4,712,098 | 12/1987 | Laing | 340/566 |
| 4,901,055 | 2/1990 | Rosenberg et al. | 340/467 |
| 4,916,431 | 4/1990 | Gearey | 340/467 |

FOREIGN PATENT DOCUMENTS

| | | |
|---|---|---|
| 0360167 | 3/1990 | European Pat. Off. . |
| 1945867 | 9/1968 | Germany . |
| 2544695 | 2/1976 | Germany . |
| 0084639 | 5/1984 | Japan .................. 340/467 |
| 0067643 | 4/1986 | Japan .................. 340/467 |
| 1436227 | 5/1976 | United Kingdom ....... 340/467 |

*Primary Examiner*—Donnie L. Crosland
*Attorney, Agent, or Firm*—Merchant & Gould Smith, Edell, Welter & Schmidt

[57] ABSTRACT

An acceleration vector activated system to be used in vehicles in association with brake lights and the acceleration pedal, comprises: (a) acceleration vector sensing apparatus connected to the acceleration pedal, to generate a signal proportional to the acceleration vector of the accelerator pedal; and (b) circuit apparatus, connected to the acceleration vector sensing apparatus and to the vehicle brake lights, the circuit apparatus being capable to analyze the level of the signal generated by the acceleration vector sensing apparatus and to activate the brake lights when the signal is above a predetermined threshold value.

17 Claims, 9 Drawing Sheets

BRAKE LIGHTS ACTIVATION SYSTEM AND INERTIAL SIGNAL-GENERATING DEVICE THEREFOR

FIELD OF THE INVENTION

The present invention relates to a safety system for the activation of brake lights of a car before actual braking takes place. In another aspect, the invention relates to an inertial signal-generating device of improved design.

BACKGROUND OF THE INVENTION

For many years, safety aspects of car signalization on the roads have been subject to efforts of improvement. Better light bulbs and Center High Mounted Stop Lamps (CHMSL) are only the most recent solutions that are continuously improving the signaling of the vehicle on overpopulated roads nowadays.

It is known that the time a driver's leg requires to move from accelerator to brake pedal in imminent, sudden braking situations is 0.2–0.3 seconds. Efforts have been made in the art to illuminate the brake lights before the brake pedal has been actually activated, thus alerting the driver of the vehicle immediately behind of the imminent change in speed of the car in front of him.

Inertial signal-generating devices are also known in the art, and generally comprise an element which is free to bend under inertial forces, and the bending of which causes a change in electrical properties of this element, or of an additional member connected thereto, which is in turn connected to electrical connections. The change in electrical properties, e.g., conductivity, causes a change in the electrical signal emitted by the signal-generating device, thereby alerting receiving means, which receive this signal and detect the change, that inertial forces have been applied to the signal-generating device.

Such signal-generating devices have a variety of applications, for instance, in crash analysis, or in industry to analyze different dynamical behaviors of different moving parts, and for many other purposes which will be appreciated by the skilled engineer. A particular use is that described in which the inertial signal-generating device is exploited in a brake lights activation system, to activate a circuit which causes the brake lights to light up when the acceleration pedal is suddenly released, and before the brake is actually actuated. In this particular use, the inertial signal-generating device detects the sudden and abrupt release of the pedal, and generates a signal which is analyzed by appropriate electronic circuits.

THE PRIOR ART

In recent years various patents in this field have been issued, but only a few of them disclose solutions marking the difference between normal and panic foot reaction. Eckstein et al., U.S. Pat. No. 4,894,652, discloses the system ABLD, shown in FIG. 2, which utilizes an electromagnetic or pneumatic sensor 12 mounted on the accelerator pedal, the driver's foot resting upon it.

The principle of the sensor is, in one version, the vacuum level produced by the driver's foot. In another version, it is based on the electromagnetic signal produced by the movement of a ferromagnetic part in front of an electric coil.

When the driver's foot is removed from the accelerator, the sensor produces a signal proportional to the foot speed. Whenever the sensor signal reaches a preset value, the electronic circuit activates the brake lights. The brake lights remain lit for one second if the brake pedal is not activated.

The ABLD is using a mechanical device as sensor. The mounting area of the sensor is on the acceleration pedal of FIG. 2, the driver's foot resting upon it. This mounting has a negative impact on the human engineering design of the pedal, by changing the height and the angle of the pedal in respect to the vehicle floor, and altering its position in respect to the brake pedal. The sensor on the gas pedal, with the driver's leg resting upon it, is subject to inadvertent mechanic blows that weaken the mounting, especially on accelerator pedals made of plastic. Furthermore, the sensor is subjected to accumulation of dirt and alien objects such as small stones.

These disadvantages, along with the fact that the sensor is of a mechanical design including moving parts and rubber parts, render this device unreliable, complicated and expensive to manufacture.

Rosenberg et al., U.S. Pat. No. 4,901,055, discloses the system VDWS (FIG. 1), based on a ceramic piezo-electric sensor, preferably mounted on the floor of the vehicle. The principle of the sensor is the piezo-electric effect produced by the mechanical impact of the plunger. The plunger 113, mounted on the acceleration pedal arm in FIG. 1, is resting upon the sensor 110. When driving, the driver's foot, 100, actuating the accelerator pedal 102, separates the plunger from the sensing area of the sensor. When the driver's foot releases the accelerator pedal, the plunger applies an impact proportional to the accelerator pedal releasing velocity. This impact produces on the piezo-electric sensor a signal proportional to the force of the impact. The electronic circuit analyzes the signal level, and when this signal goes beyond a preset threshold, the brake lights are lit for one second if the brake pedal is not activated.

The VDWS composes two distinct parts: the sensor with the electronic circuit 110, and the impact plunger 113. These parts are mounted on two different places, one on the vehicle floor and the other on the accelerator pedal arm. The disadvantage of this design becomes significant when the VDWS has to be installed on a purchased vehicle (aftermarket installation). In order to be installed, VDWS requires a large number of different mechanical adaptors to fit all the different floor shapes and accelerator pedal arms.

The production of mechanical adaptors is expensive and, along with the logistic problems posed by such a large number of items, renders aftermarket installations very difficult. The design of a universal mounting kit is a difficult task, due to the great number of different vehicles on the market. Mechanical alignment of the sensor 110 with the plunger 113 is difficult, and improper alignment can result in damage to either plunger or sensor.

A further significant disadvantage is the fact that working on the principle of the piezo-electric effect produced by the plunger impact, the VDWS is heavily influenced by the strength of the spring 114. This drawback led to two different sensors, one for the force of the spring up to 3.5 kg, and another for forces above 3.5 kg. The installation of the wrong sensor could lead either to non-functioning or to numerous false alarms of the VDWS.

Prior art inertial signal-generating devices suffer from a number of drawbacks. First of all, they are complicated in design and require the soldering of electric contacts on their inertial signal-generating element, or alternatively, other expensive and unsafe connections such as conductive glue, pins, spring contacts, electric connectors or the like. This leads to a high occurrence of failures in the devices, because of the unreliable connection. Furthermore, assembly of prior art devices is complicated and expensive, and requires highly trained manpower.

It is an object of the present invention to provide a simple and reliable brake-light activation system which overcomes the drawbacks of prior art devices.

It is another object of the present invention to avoid false alarms which activate the brake lights unnecessarily. It has been found that in order for the sensor to sense a sudden movement of the acceleration pedal efficiently, while avoiding false alarms as much as possible, it is desirable to provide in all cases for a sudden stoppage of the acceleration pedal, and to provide a threshold within the sensor, to prevent it from being activated by movements deriving, e.g., from irregularities of the road.

It has further been found, and this is another object of the invention, that it is possible to provide devices which can be connected using two wires only, thus eliminating the need for the minus (−) wire, and thus simplifying installation and rendering the operation of the device more reliable.

It is still another object of the present invention to provide an inertial signal-generating device which overcomes the drawbacks of the devices of the prior art, and which is highly reliable and simple and inexpensive in construction.

The safety system according to the invention, when installed on the accelerator pedal, senses the acceleration vector produced by the pedal movements. When the said acceleration vector goes beyond a preset value, as in the sudden release of the acceleration pedal, the electronic circuit will activate the brake lights for a predetermined period of time, typically for one second.

This is achieved by a relatively small and simple safety system which offers an easy to install device for vehicle manufacturers (OEM) and for purchased vehicles (aftermarket vehicles).

The system according to the invention is a universal safety system to be used in all after market vehicles with no special adaptors required. It is based on Force Sensing Resistor (FSR) to sense the acceleration vector produced by the movements of the accelerator pedal. It provides a safety system which dramatically improves the car imminent brake signalization, whenever the sudden release of the accelerator pedal occurs.

According to the invention, an acceleration sensor is mounted on the accelerator pedal arm without interfering with the human engineering of the pedal, sensing the acceleration vector produced by the movements of the accelerator pedal. The signal produced by the sensor is fed to an electronic circuit of an appropriate design to analyze the level of the said signal and to activate via a timing circuit the brake lights, as stated, for a predetermined period of time.

The system comprises a sensor housing and an electronic circuit housing. The sensor housing is built to allow the FSR to bend freely at one end, while the other end is fixed to the housing, and the said housing attached to the acceleration pedal. The stronger the acceleration vector is, the higher the deflection of the FSR becomes, and a stronger signal is provided. When the signal reaches the predetermined level, the electronic circuit will activate the brake lights for one second.

According to a preferred embodiment of the invention, the safety system for the activation of the brake lights and/or other safety devices of a vehicle in response to a sudden release of the acceleration pedal comprises:

(a) stopper means coupled to the acceleration pedal, to cause a brusque stoppage of the said pedal after a predetermined displacement;

(b) inertial signal-generating means comprising a housing containing a moving element which is free to move when the said housing is brought to a halt, which moving element, when moving relatively to its housing by a predetermined amount, causes a signal to be generated; and (c) signal receiving and processing means to cause the brake lights to light up, or another safety device to be actuated, when a predetermined desired signal is generated.

Of course, if the pedal has different shapes, is provided with stem, is connected to a cable, or is of any other shape or construction, stopper means can be provided at any appropriate position, provided that they are suitable to bring the housing of the inertial signal-generating means to an abrupt stop at the predetermined position.

According to a preferred embodiment of the invention, the inertial signal-generating means comprise a force-sensing resistor or a piezoelectric device or a reed switch, or a mercury or vibration or the like switch.

According to another preferred embodiment of the invention, the moving element is made of a flexible material and is fixed at an extremity so that it is free to bend when its housing is brought to a sudden standstill position.

As will be appreciated by the skilled person, with certain signal-generating means a signal may be generated also when the acceleration pedal is pushed down suddenly. In order to avoid such an occurrence, which may lead to the lighting up of the brake lights or the actuation of another device, an electronic and/or logic circuit means can be provided, to suppress signals generated by movement of the moving element in the direction which causes the vehicle to accelerate. For this purpose a latch circuit can be employed, such as those used in competitions to determine the first competitor who generates a signal, such as a light or a bell. This circuit can be coupled with, e.g., a Siemens BSS149 depletion transistor, to identify the negative signal which is generated by the signal-generating means when the acceleration pedal is pushed strongly forward or receives a blow, or a comparable element, connected to one of the branches of the latch circuit, to disable the positive branch which identifies a quick release of the pedal when a negative signal is received first. Designing appropriate circuit means is within the scope of the skilled engineer, and is therefore not detailed here for the sake of brevity.

As stated, the inertial signal-generating means can be positioned in any appropriate position. Two such suitable positions are, for instance, on an auxiliary pedal which can be coupled with the acceleration pedal, or on or near the carburetor and on the cable leading thereto.

The inertial signal-generating device according to the invention comprises a bendable base onto which there is rigidly connected a bending sensor which changes its electric properties upon bending, the said bending sensor being provided with two electrodes positioned on its upper surface, electric contacts being provided in the signal-generating device to transmit the electric signal generated by the bending of the bending sensor to its destination, for further processing, the electric connection between the electrodes of the said bending sensor and the said electric contacts being effected by means of a Zebra conductor. By "Zebra conductor" is meant an element built of combined conductive and non-conductive compressible material, such as Silicone Rubber. Preferably, such conductor is built of a plurality of layers, such layers being alternately conductive and non-conductive, so that electricity is transmitted only along the conductive layer. However, other arrangements comprising conductive zones embedded in non-conductive material are also contemplated by the invention. Such devices, which are normally in the shape of a block or cube, are well known in the art, and require no particular description. They can be made of a variety of material, e.g. rubber, in which case the conductive layers will be made of conductive rubber, which is rubber that incorporates conductive material, such as graphite. An example of such connectors are the silicone rubber connectors made by You-Eal Corporation, Korea.

According to a preferred embodiment of the invention, the device comprises electric contacts provided in a roofing element, the distance of which from the electrodes of the bending sensor is smaller than the height of the Zebra conductor, which causes the said Zebra conductor to be in a compressed state whenever in the mounted position. This insures good and safe electric contact between the bending sensor and the electric contacts of the device.

The bending sensor can be of any appropriate type, and is preferably selected from a force-sensing resistor or a piezo-electric element or film.

As stated, the base element on which the bending sensor is positioned must bend in order to cause a change in electric properties of the sensor. This is caused by inertial forces when the device moves or stops suddenly, and this effect can be aided by providing a weight positioned at the extremity of the bending portion of the device, which weight may be integral with the bending portion, which can conveniently be made of plastic material, or can be connected to the bending element, e.g., to employ heavier material. Thus, for instance, a metal weight can be employed together with a plastic bending base.

BRIEF DESCRIPTION OF THE DRAWINGS

The above and other characteristics and advantages of the invention will be better understood through the following illustrative and non-limitative description of preferred embodiments of the invention, with reference to the appended drawings, wherein.

DETAILED DESCRIPTION OF PREFERRED EMBODIMENTS

Figure 1:
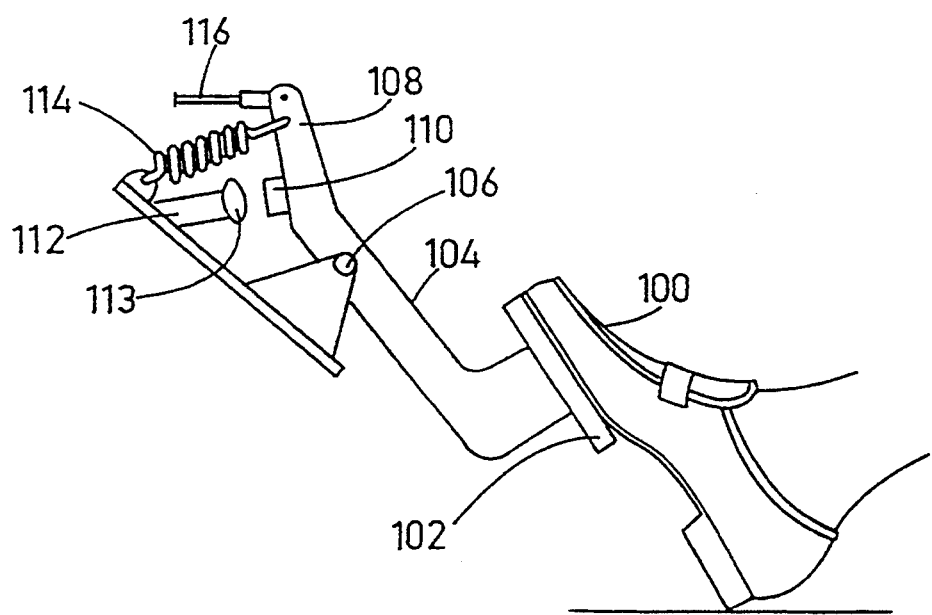
FIG. 1 illustrates the way VDWS is mounted on the accelerator pedal area.
Figure 2:
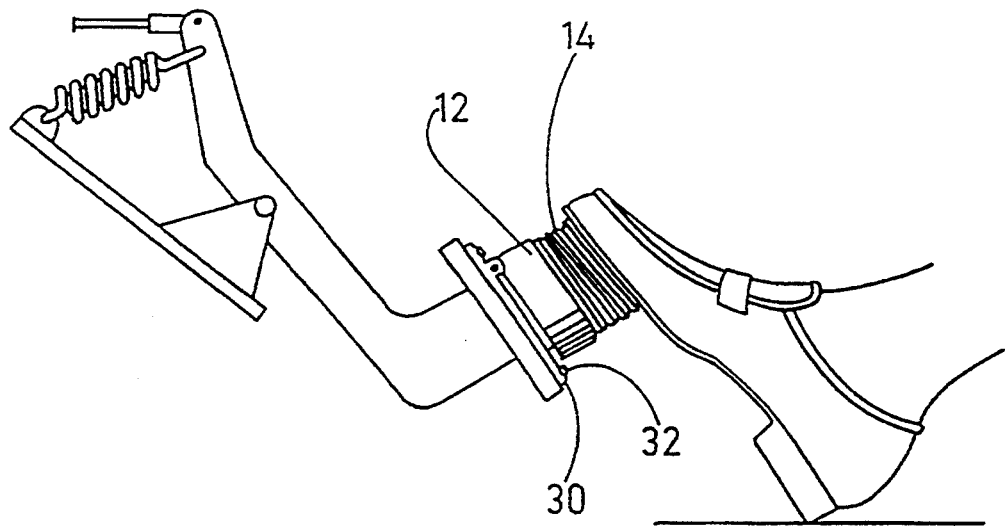
FIG. 2 illustrates the way ABLD is mounted on the accelerator pedal.
Figure 3A:
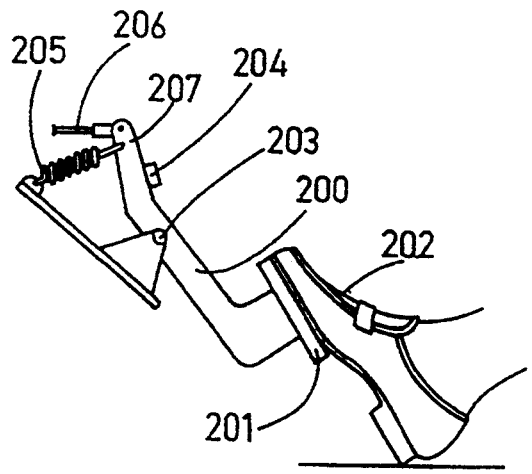
FIG. 3A illustrates the preferred installation of the GAS on the accelerator pedal arm.
Figure 3B:
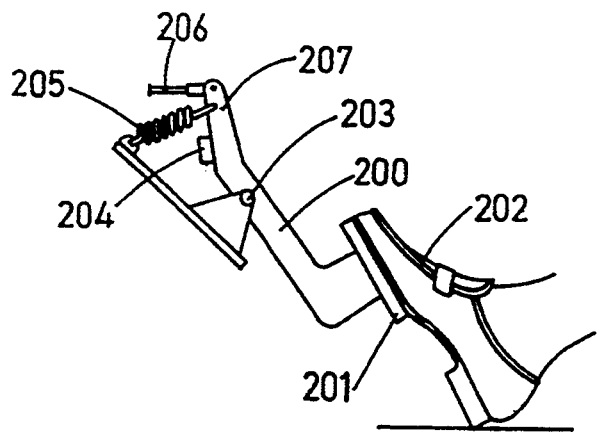
FIGS. 3B, 3C, 3D and 3E illustrate different possible installations of the GAS on the accelerator pedal.
Figure 3C:
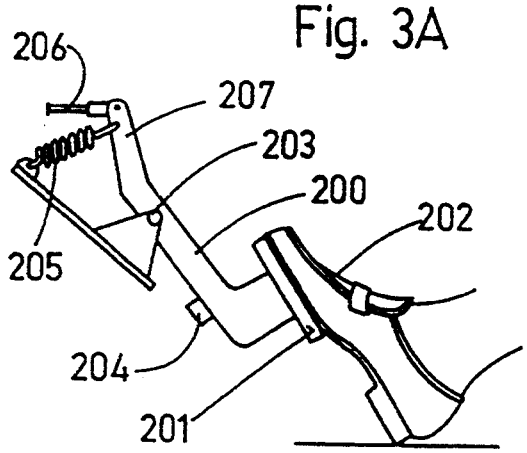
Figure 3D:
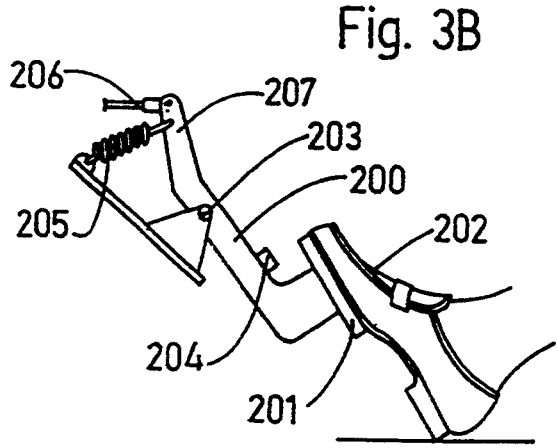
Figure 3E:
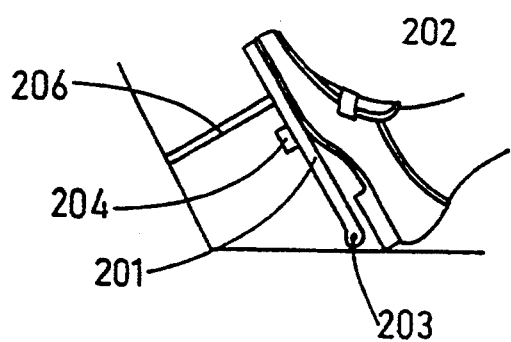

In FIG. 3A a first GAS mounting possibility is shown. The sensor is attached to the accelerator pedal arm 200 on the upper side 207. The human engineering and the functioning of the accelerator pedal remain unchanged. During normal driving, the driver's foot 202 actuates the accelerator pedal 201, tensing the spring 205 and pulling the carburetor cable 206. According to IL 97397, the movements of the accelerator pedal produce all the time an acceleration vector on the sensor 204. The acceleration vector causes a change in an electric parameter in accelerator sensor 204. In the FSR version, a drop in the electric resistance of the sensor occurs, while in the piezo-electric version an electric charge is produced by the piezo-electric element. When the change in the electric parameter of the sensor 204 produced by the acceleration vector passes beyond a predetermined level, as when the driver's foot suddenly or abruptly releases accelerator pedal 201, the electronic circuit of the GAS activates the brake lights for one second.

According to a preferred embodiment of the present invention, threshold means are provided so that mere acceleration of the moving element positioned on the pedal, in any appropriate position, is not sufficient to generate a signal that will actuate the brake lights. According to this preferred embodiment of the invention, when the foot is released from the pedal spring 205 (or any other appropriate means) cause the pedal to return to its non-acceleration position quickly, and stopper means are provided so that when the pedal reaches its final position it stops abruptly. Stopper means can be of any suitable type, as long as they are positioned so as to prevent upwards movement of the pedal beyond a predetermined position. The stopper means will typically be mechanical stopper means which physically stop the pedal, but any other suitable device can be employed, e.g., a stopper can be positioned on the accelerator cable, to limit its movement against the body of the vehicle. Only when such an abrupt change takes place, and the moving element of the inertial signal-generating means continues to move by a predetermined amount, then the signal will be generated. Of course, this quantity can be preset, according to different pedals and location of the pedal, so that the signal is generated always only when the pedal stops abruptly. For instance, if the pedal has almost reached its inertial position, even if it is abruptly released for the remaining small fraction of its path, this would not cause the brake lights to be actuated. In this way, many false alarms can be avoided. On the other hand, when the pedal is pushed downwards, e.g., halfway, and is suddenly released, the force applied by spring 205 will be sufficient to cause enough momentum so that the moving element of the inertial signal-generating means will move sufficiently to generate the signal which would actuate the brake lights.

Figure 4:
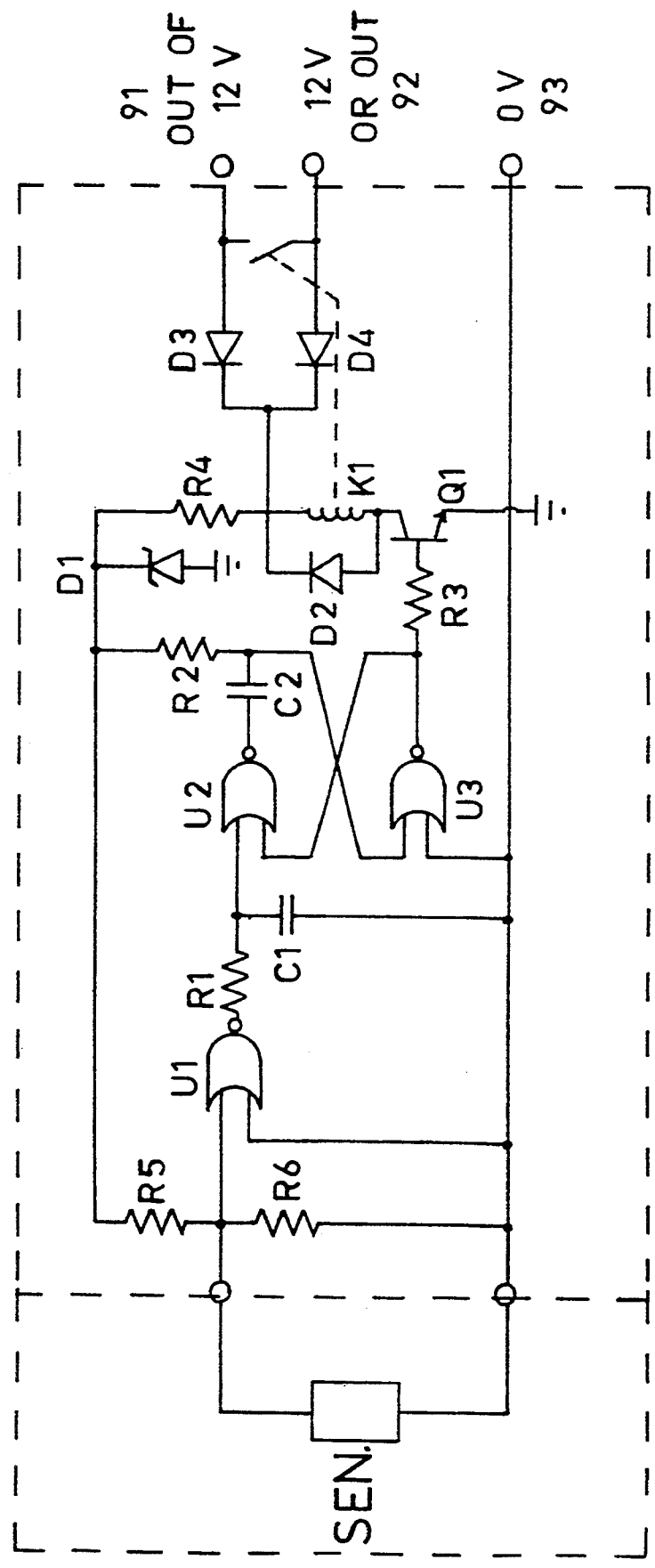
FIG. 4 illustrates the electronic circuit of the GAS according to one embodiment of the present invention.

In FIG. 4, the electronic circuit of GAS is shown. The electronic circuit will perform the following functions:

Interface the signal from the sensor SEN with the electronic circuit via U1.

Set the threshold value for the input signal via R1/C1.

Activate the timer latch for a preset period of time, for instance one second, via U2, U3, R2 and C2.

Activate the power relay K1 via power driver R3 and Q1.

Perform power regulation for its electronic circuit via D1 and R4.

Figure 6:
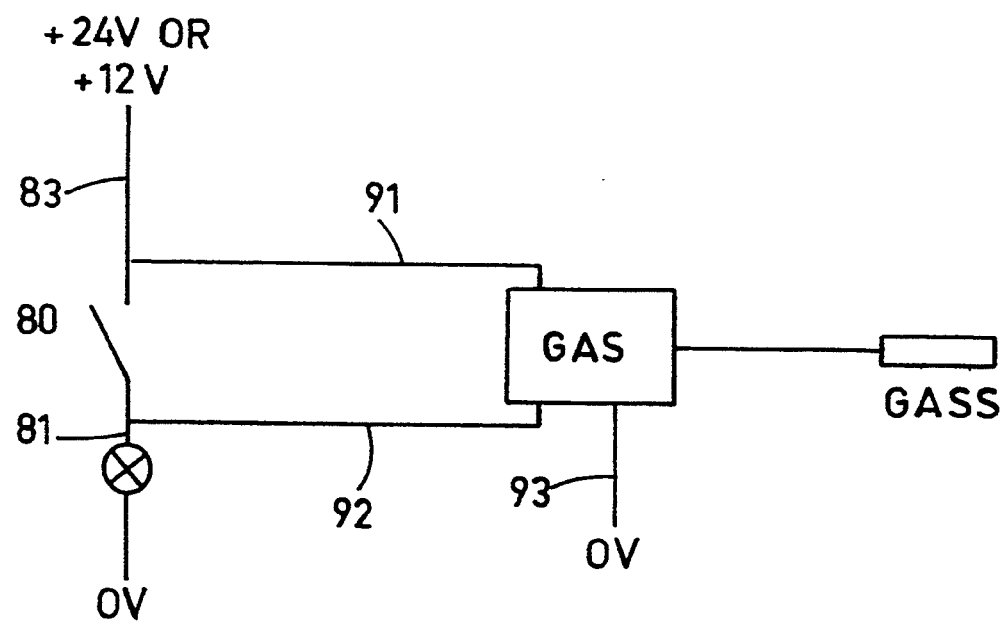
FIG. 6 illustrates the GAS electric wiring to the vehicle brake lights switch.

Facilitate the connection of the GAS to the brake lights unit by allowing via D3 and D4 the connection of either wire 91 and 92 to either wire 81 and 83 FIG. 6.

Prevent GAS or the electrical system of the vehicle from damage if the GAS wiring is not properly done, via D3 and D4.

The inertial signal-generating means, according to a preferred embodiment of this invention, is shown in FIG. 5. The housing is made of two parts:

the basis 320 comprising attachment means 323 and 322 to the accelerator pedal arm and sensor support 321 with screw 340 for attachment to FSR, or piezo or mercury or the like sensor. The screw can be replaced by adhesives, welding or any other mechanical connection;

the cover 310, protecting the FSR against inadvertent touch during GAS installation.

The housing 310 and 320 is attached to the accelerator pedal arm via attachment means 322 and 323. The movements of the accelerator pedal arm are being transmitted to the housing 320 and 310 and through the sensor support 321 to the FSR 330. The right side 331 of the sensor 330 is bending freely toward the basis 320 under its own inertia, when the acceleration pedal is released by the driver's foot, and abruptly stops.

The bending of the sensor 330 causes electrical parameter changes in the sensor. In the version of the FSR, the bending of the right end 331 produces a mechanical stress between the sheets 433 and 434 (FIG. 5B). This stress causes the electrical resistance of FSR to drop. When the electrical resistance of the sensor 330 drops below a preset value, the electronic circuit (FIG. 4) will activate the brake lights for one second. In another version of the sensor, a piezo-electric element is used. The right side 331 of the sensor 330 made of materials like plastic, ceramic or other, and bends freely when the housing 310 comes to a halt.

In another embodiment, the base 320 has two supports 321 supporting both ends 331 and 332 firmly in place while the middle of the sensor 330 can bend freely toward the base 320. Still another embodiment can be envisioned by those skilled in the art where the sensor is of round shape and held in place by the edges, while the middle of the sensor bends freely toward the base, under the influence of the acceleration vector.

The housing 320 and 310 of the sensor 204 is made of a rigid material, for example, metal or plastic. The housing has the means to accommodate the moving element 330, and to allow it to bend freely in order to provide the change in its electrical parameters. The housing is provided with suitable openings and fasteners to let the wires 351 and 352 exit, and to fasten the ends of the wires to the housing.

The construction of a typical Force Sensing Resistor is shown in FIG. 5B, and is based on two polymer films or sheets. A conducting pattern is deposited on the polymer sheet 434 in the form of a set of interdigiting fingers. The finger pattern is typically on the order of 8.4 mm finger width and spacing, but other spacings can be used, as well. Next, a conductive polymer is deposited on the other sheet, 433. The sheets are facing together so that the conducting fingers are shunted by the conductive polymer. When no force is applied to the sandwich, the resistance between the interdigiting fingers is quite high. With increasing force, the resistance drops, following an approximate power law. The resistor is connected to the electric wires 351 and 352 of sensor 204 (FIG. 5A), via connections 351' and 352'.

Figure 5A:
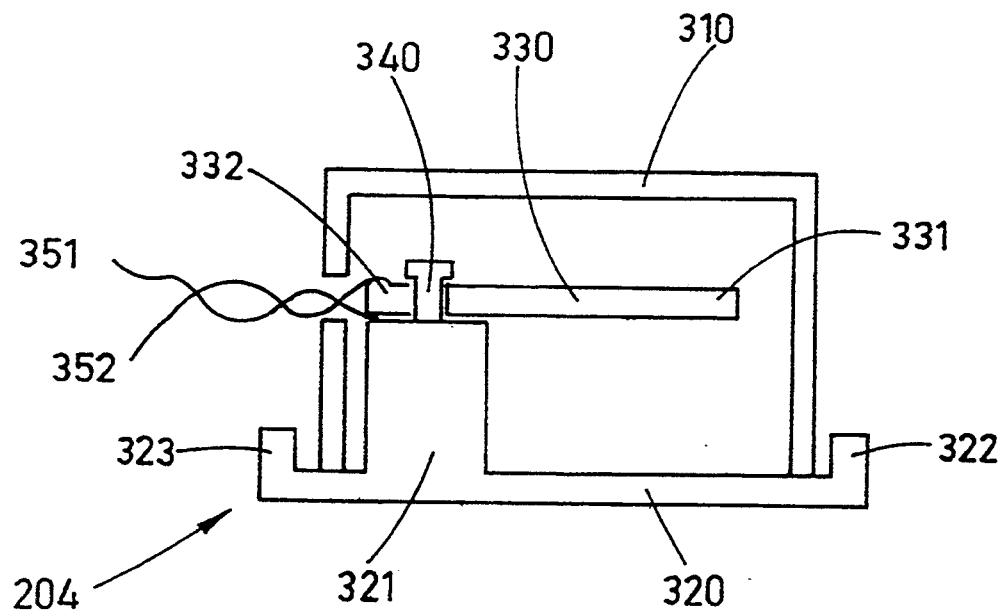
FIG. 5A is a cross-section of a sensor according to one preferred embodiment of the invention.
Figure 5B:
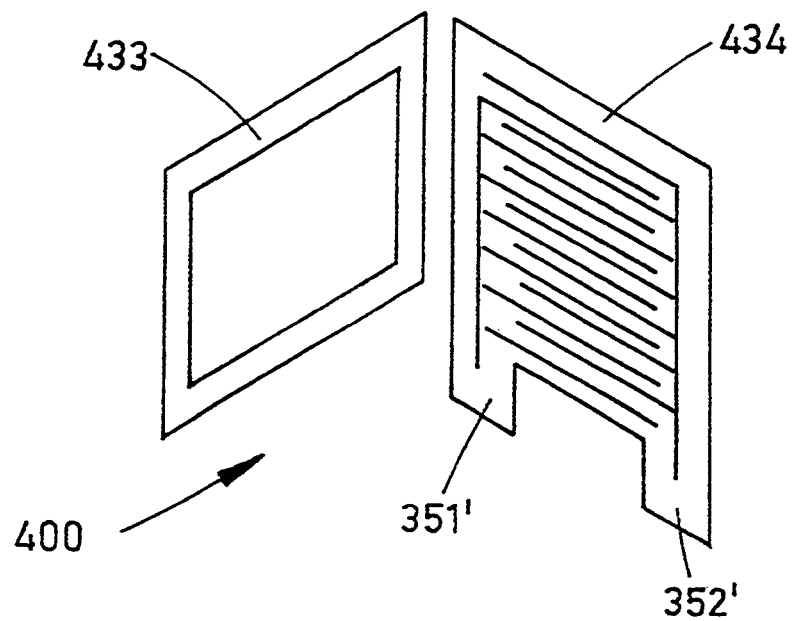
FIG. 5B illustrates an exploded view of a Force Sensitive Resistor.
Figure 5C:
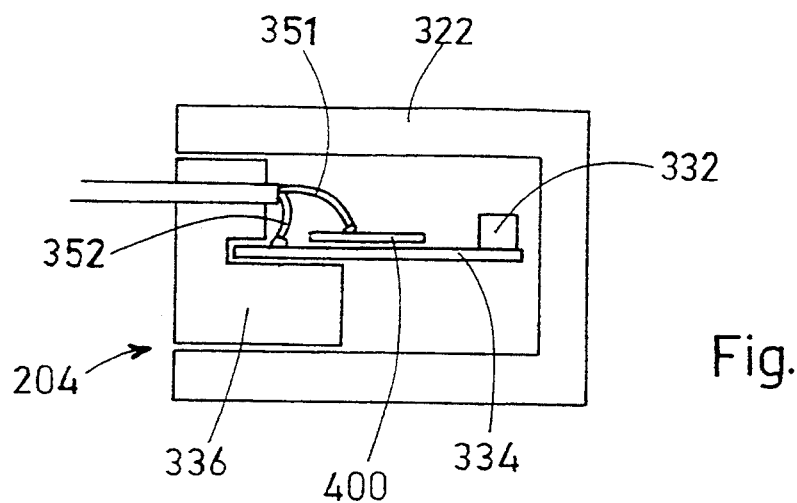
FIG. 5C is a cross-section of a sensor, according to another preferred embodiment of the invention.

Turning now to FIG. 5C, a sensor, indicated as before by numeral 204, is constructed according to another preferred embodiment of the invention. According to this embodiment, the moving element 334 is provided with a weight 335, which has the purpose of increasing its inertia and to assist in causing it to bend. The weight can be constructed as an integral part of the moving element, e.g. if the moving element is made of plastic material or of cast material in general, or can be attached to the moving element by any suitable means, e.g. by glueing. In FIG. 5C the moving element 334 is made of conductive material, and the electric wire 352 is thus connected to the moving element itself, which is in turn in electric contact with one end of, e.g., a signal generating element 400, which may be, e.g., a piezoelectric film or the resistor of FIG. 5B. Wire 351 is connected directly to the upper contact of element 400.

The electric contacts between element 400 and wires 351 and 352 can be effected in any suitable way, e.g., by soldering, conductive glue, pins, spring contact, electric connectors or the like, as long as they ensure sufficient and reliable electric contact.

Figure 5D:
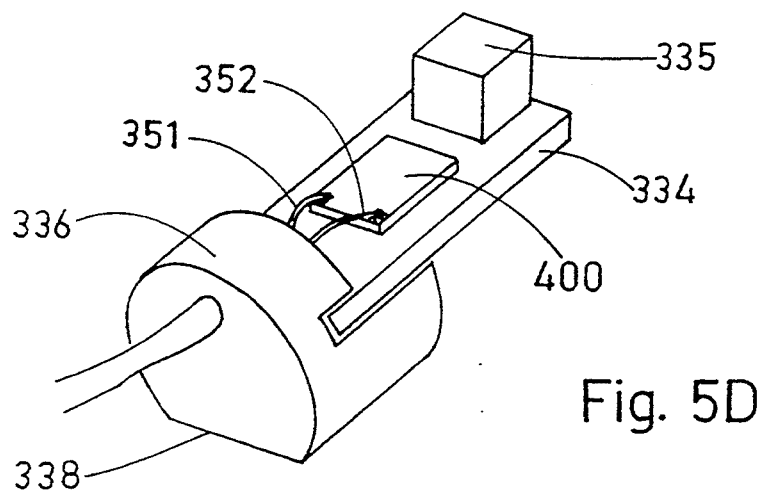
FIG. 5D illustrates a moving element and its connections, according to one preferred embodiment of the invention.

The moving element 334 is held in place by its connection to the holder 336, which connection can be effected by a screw or the like connection, as illustrated in FIG. 5A, or by glueing or welding, or by any other suitable means, but moving element 334 can also be integral with holder 336 and can be, for instance, made of a single piece of cast plastic material. In FIG. 5D there is illustrated a combination according to one embodiment of the invention, in which moving element 334 is separate from holder 336, and is connected to it, e.g., by glueing. According to this embodiment of the invention, a signal-generating element 400 is provided which, again, may be a piezoelectric film or a device as shown in FIG. 5B, both electrodes of which are positioned on the upper side, so that both wire 351 and 352 are connected directly thereto. According to this embodiment of the invention, the moving element 334 is not required to be made of conductive material. It is also worth noting in this figure the blunt end 338 of the holder 336, which can conveniently be provided to insure proper installation of the device within its housing.

Figure 5E:
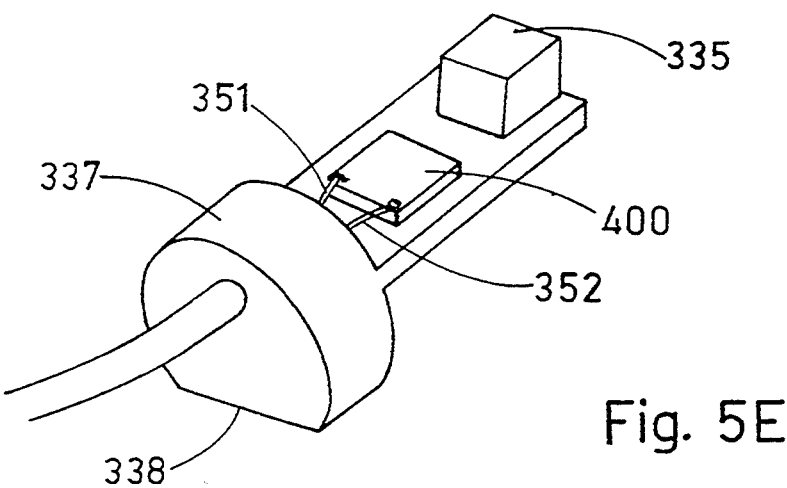
FIG. 5E illustrates a moving element and its connections, according to another preferred embodiment of the invention.

In FIG. 5E yet another preferred embodiment of the invention is illustrated, in which the body 337 comprises both the holder and the moving element which is integral with the holder. This is convenient when it is desired to manufacture the element 337 in one piece, e.g., by casting a plastic material.

FIG. 6 shows the connection between GAS and the vehicle brake lights. The outputs 91 and 92 of the GAS are connected to the two wires of the vehicle brake lights 81 and 83. The electronic current of the GAS is built to accept either wire 91 and 92 connected to either wire 81 and 83, without polarity.

Figure 7:
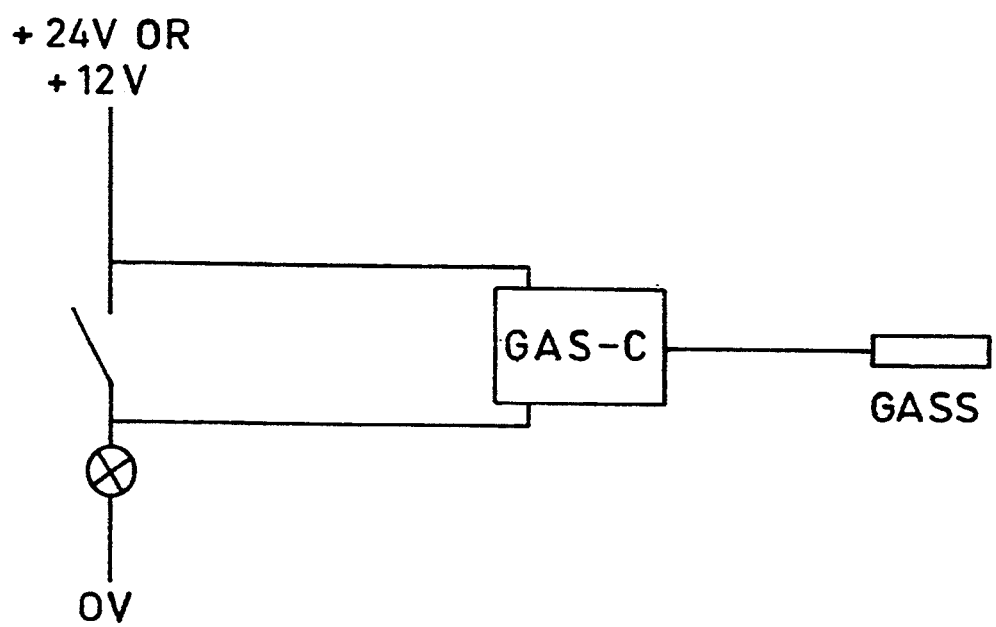
FIG. 7 illustrates a 2-wire device.
Figure 8:
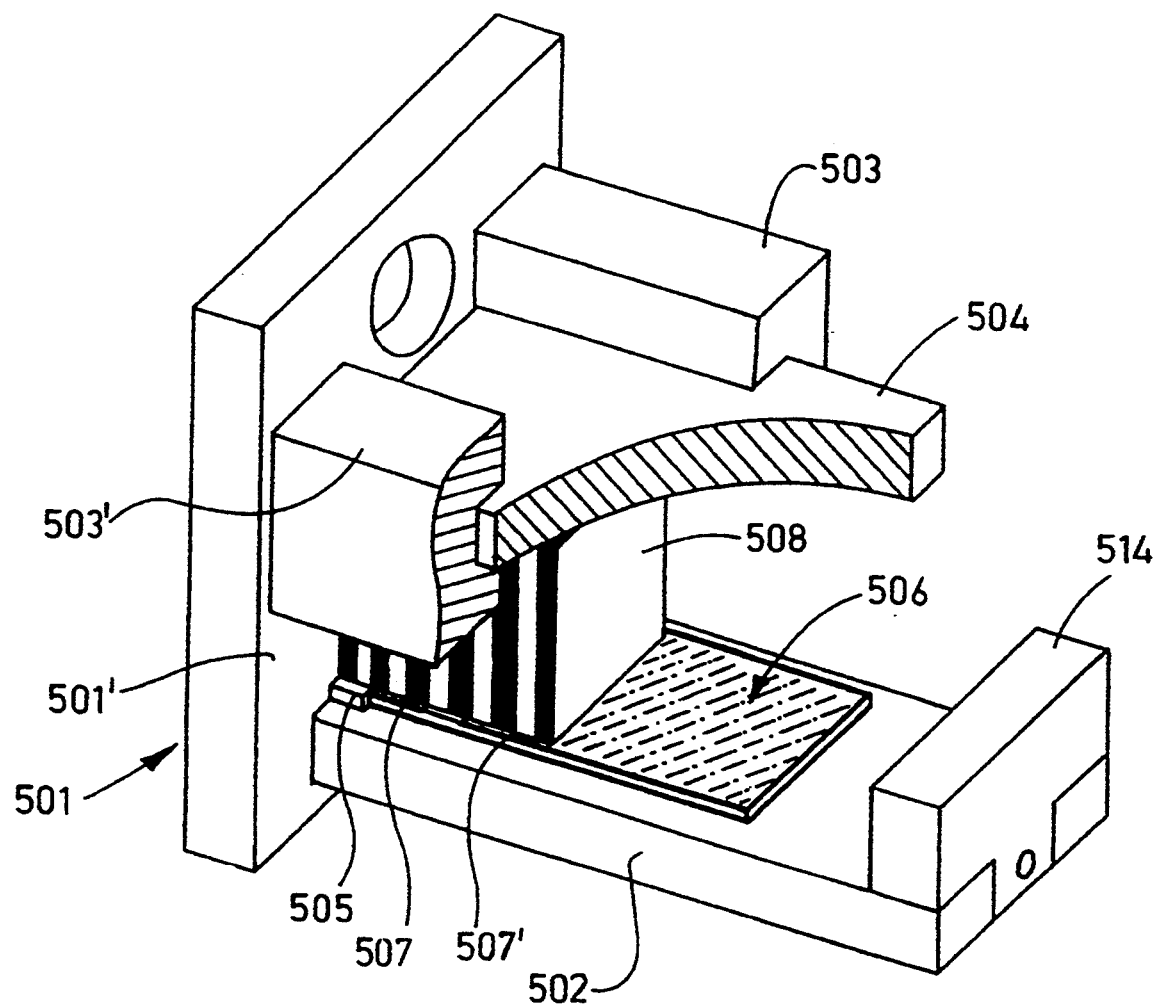
FIG. 8 is a partial cross-section of a perspective view of a device according to one embodiment of the invention.
Figure 9:
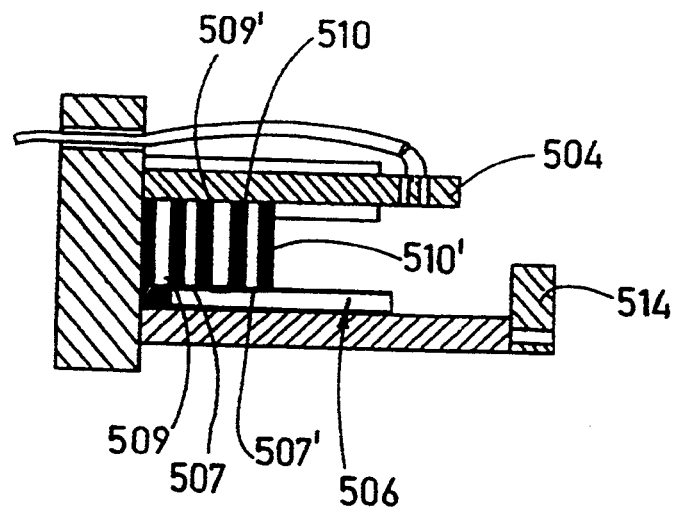
FIG. 9 shows a latter cross-section of the device of FIG. 8.

In FIG. 7, a different connection between the GAS and the vehicle brake lights is shown, which is a 2-wire arrangement. The difference between the circuits of FIG. 6 and FIG. 7 is that in FIG. 7 an internal power supply is to be provided, since a small leakage current will always be present in the circuit. However, the advantage of having only two wires to be connected is considerable, because the installation work is reduced, and because it is normally difficult to locate the minus (−) wire in a motor car, and its connection to the vehicle is sometimes precarious.

In the figures the GAS sensor is indicated as GASS, and the GAS arrangement is indicated as GAS and as GAS-C, in FIGS. 6 and 7 respectively.

In FIGS. 3A, 3B, 3C, 3D and 3E, different GAS mounting possibilities are shown. Due to its relatively small dimensions and its friendly design, the GAS 204 can be easily installed either on the acceleration pedal arm 200, FIGS. A, B, C and D; or under the accelerator pedal 201 of FIG. 3E. The GAS is very simple, however, using the latest state of the art technology sensor, which is specially designed to adapt easily to most acceleration pedals known in the market. The GAS may be connected by the manufacturer of the vehicle at the time of manufacturing, or may easily be installed later by the purchaser. The installation requires no special tools.

FIGS. 8–11 show an inertial signal-generating device. In these figures, numeral 501 generally indicates the main body of the device according to the embodiment shown in the figures, to which there are connected a number of elements: the bendable base 502, which may be integral with the main body 501, or may be connected thereto, in any appropriate way, and supporting elements 503 and 503', for the roofing contact element 504, which will be discussed later. Stopper means 505 can be connected either to base 502, or to main element 501, or to both. Elements 501, 502, 503, 503' and 505 can of course also be made of one piece, e.g., by casting or moulding of a plastic material.

As is clearly seen in the figures, the bending sensor, 506, according to the embodiment shown in the figure, is made of a flat element onto which a film has been connected, which creates two electrodes, 507 and 507', which are both on the upper part of sensor 506. Sensor 506 is positioned in its correct position by providing stopper element 505, which limits its position with respect to the main body 501.

A Zebra connector 508 is provided, which is in contact with both electrodes 507 and 507'. However, because of its nature, only elements 509 and 509' (FIG. 9) will be in contact with electrode 507, while only layers 510 and 510' will be in contact with electrode 507'. On the other side of connector 508, on roofing element 504, appropriate electric contacts will be positioned so as to be in contact with the appropriate section of connector 508 (not shown in FIG. 9). This can be seen, e.g., in FIG. 11, in which roofing element 504, which can be, e.g., a printed circuit board, is seen to be provided with two contacts, 511 and 511', which are in turn connected by electric connections (not shown) to electric wires 512 and 512', which lead the signal to the appropriate analyzing means. The electric contacts 511 and 511', as well as their electric connections to wires 512 and 512', can be embedded in roofing element 504, or can be connected thereto and may be, e.g., strips of conducting materials, and the appropriate construction of these connections can be easily devised by the skilled engineer.

Figure 11:
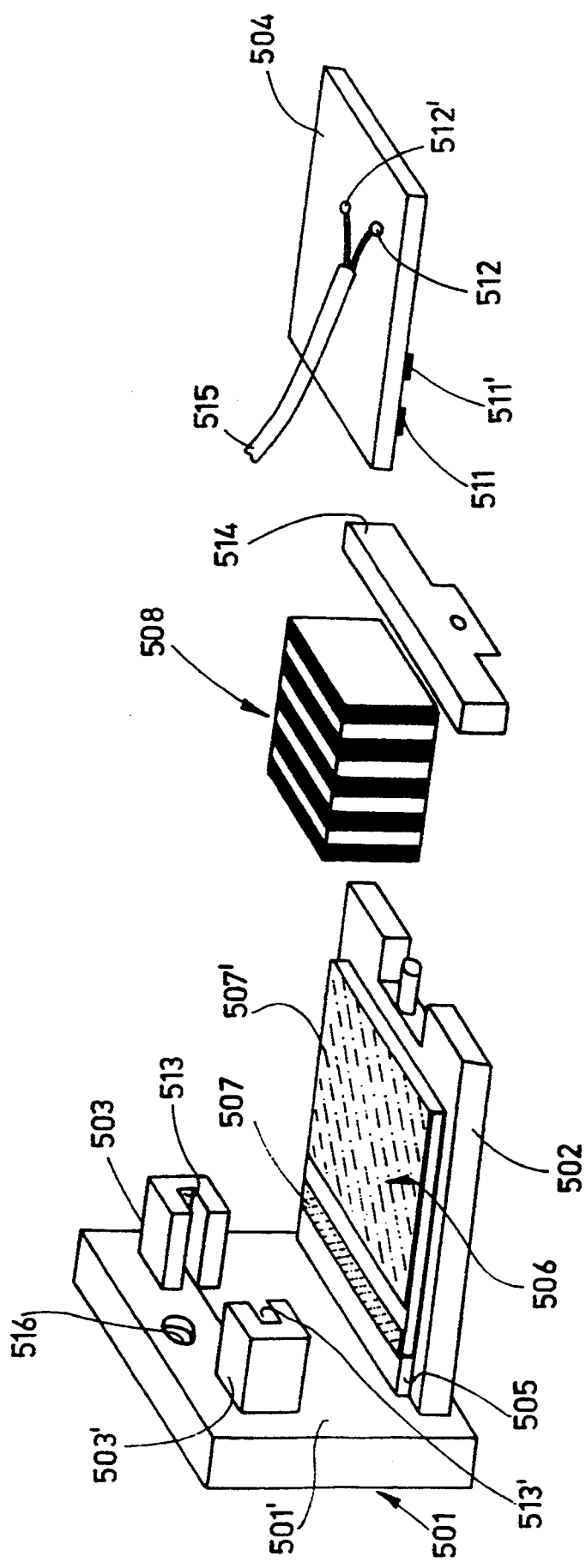
FIG. 11 is an exploded view of the device of FIG. 8.

As is seen in the figures, and particularly in the exploded view of FIG. 11, roofing element 504 is connected to the device by sliding it into grooves 513 and 513' of elements 503 and 503', which will hold it in place in its assembled position. An additional weight 514 is provided, according to this embodiment of the invention, to promote bending of basis 502, which weight can be of any suitable material, depending on the specific density required of this weight.

Looking now at the exploded view of FIG. 11, the assembly of the inertial signal-generating device, according to this embodiment of the invention, is effected as follows. The bending sensor 506 is positioned on bending basis 502, until it stops at stopper 505. Connection between the bending element 506 and bending basis 502 must be thorough and rigid, and can be effected, e.g., by glueing. Next, Zebra connector 508 is positioned on bending sensor 506, in juxtaposition with the inner wall 501' of wall element 501, and then roofing element 504 is caused to slide into grooves 513 and 513' of elements 503 and 503', simultaneously applying a slight pressure on connector 508, so as to hold it tightly in place against bending sensor 506, and on electrodes 511 and 511' positioned on the said roofing element. When this assemblage is concluded, weight element 514, if existing, can be assembled and can be kept in place by any convenient connecting element. Of course, wiring 515 is to be passed, according to this embodiment of the invention, through opening 516 in main body 501.

Of course, appropriate encasing of the sensor will be provided, to contain the sensor elements described above, which encasing can be of any convenient shape and size, according to individual requirements of the end use, and which encasing is therefore not shown in the figures for the sake of brevity.

Figure 10:
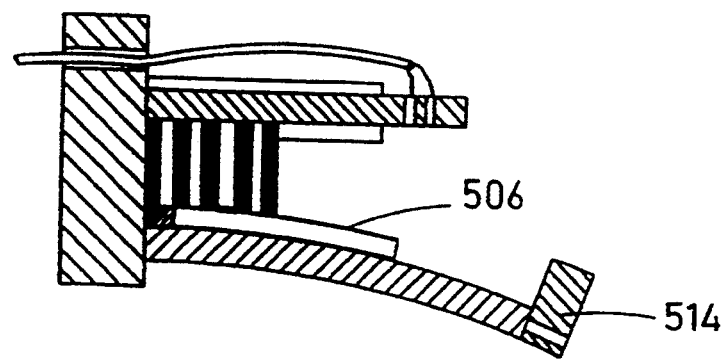
FIG. 10 shows the device of FIG. 9 during bending.

In FIG. 10 the device according to this preferred embodiment of the invention is seen in its bending state, and it is seen that its extremity, bearing the weight 514, is bending more strongly than its whole body, but such bending is sufficient in order to cause a bending of bending sensor 506. Depending on the type of sensor employed, the extent of bending can be important, or only the fact that some bending has taken place is sufficient to generate an appropriate signal.

Of course, the shape of the various elements shown in the figures is not essential, and can be changed according to design requirements and production as well as economic considerations, and the skilled engineer will easily devise a large number of different elements, leading to different looking inertial signal-generating devices. However, it is important to insure that the bending sensor is free to bend, and that the electric changes brought about by such bending are transmitted to a connecting element through an elastic connector, such as a Zebra connector, which elastic connector is held tightly in place against the electrodes, to insure effective and reliable electric contact. such Zebra connector will also be provided with insulating zones, as appropriate according to the specific use and shape of the electric contacts.

The above description of preferred embodiments has been provided solely for the purpose of illustration, and is not intended to limit the invention. Many different inertial signal-generating means can be employed, and many different arrangements can be provided. For instance, the sensor and the circuitry can be miniaturized and included in a single housing, or they may be separate from one another; different electronic and electric circuits can be provided, to fit into different housings and constructions of the device, all without exceeding the scope of the invention.

We claim:

1. An acceleration vector activated system to be used in vehicles in association with brake lights and an acceleration pedal, said acceleration pedal producing acceleration vectors in response to pedal movements, comprising:
   (a) acceleration vector sensing means connected to the acceleration pedal, to generate a signal having an amplitude proportional to an acceleration vector of the accelerator pedal;
   (b) circuit means, connected to the acceleration vector sensing means and to the vehicle brake lights through a vehicle brake light switch, for analyzing a level of the signal generated by the acceleration vector sensing means and to activate the brake lights when the signal is above a predetermined amplitude.

2. A system according to claim 1, wherein the circuit means comprises:
   (a) a sensor buffer, to interface the signal of the acceleration vector sensing means with the signal analyzing means;
   (b) a timer latch to receive the signal from the analyzer and to activate a relay driver for a predetermined period of time;
   (c) a relay driver to activate the brake lights for a predetermined period of time; and
   (d) electric wiring to be connected in parallel to the vehicle brake light switch, each wire being connected to a terminal of the vehicle brake light switch.

3. A safety system for an activation of a device of a vehicle having an acceleration pedal, said device being adapted to improve the safety of passengers thereof, said device further being activated in response to a sudden release of the acceleration pedal, comprising:
   (a) stopper means coupled to the acceleration pedal, to cause a brusque stoppage of the pedal after a predetermined displacement;
   (b) inertial signal-generating means comprising a housing coupled to the acceleration pedal, said housing containing a moving element which is free to move when the acceleration pedal and the housing are brought to a halt, said moving element, when moving relative to its housing by a predetermined amount, causes a signal having an amplitude to be generated; and
   (c) signal receiving and processing means for causing the device to be actuated when the amplitude of the signal reaches a predetermined amount.

4. An inertial signal-generating device comprising: inertial signal-generating means for generating a signal, the inertial signal-generating means including a housing containing a moving element made of a non-conductive material and provided with a weight to increase its inertia, said moving element being free to move when the housing is stationary, said moving element, when moved relative to its housing by a predetermined amount, causes the signal to be generated, said moving element including a bendable base onto which there is rigidly connected a bending sensor which changes its electric properties upon bending, the bending sensor being provided with two electrodes positioned on its upper surface, and electric contacts being provided in the inertial signal-generating device to transmit the electric signal generated by the bending of bending sensor, the electric connection between said electrodes of the bending sensor and the electric contacts being effected by means of a Zebra conductor.

5. A device according to claim 4, wherein the Zebra conductor is made of elastic material.

6. A device according to claim 5, wherein the elastic material comprises conductive rubber.

7. A device according to claim 5, wherein the Zebra conductor is in block form.

8. A device according to claim 7, wherein the Zebra connector comprises alternated insulating and conductive strips of elastic material.

9. A device according to claim 8, wherein the distance between the electric contacts of the inertial signal-generating device and the electrodes of the bending sensor is smaller than the height of the Zebra conductor, thereby causing the said Zebra conductor to be in a compressed state when in the mounted position.

10. A device according to claim 9, wherein the device further comprises a detachable roofing element for positioning the electric contacts of the inertial signal-generating device which, when in the mounted position, applies a pressure on the Zebra conductor towards the electrodes of the bending sensor.

11. A device according to claim 10, wherein the roofing element is a printed circuit board.

12. A device according to claim 11, wherein the bending sensor is a force-sensing resistor or a piezoelectric element or film.

13. A device according to claim 12, further comprising a weight positioned at or near the extremity of the bendable base.

14. A device according to claim 13, wherein the weight is integral with the bendable base.

15. A device according to claim 13, wherein the weight is connected to the bendable base by means of appropriate connecting means.

16. A device according to claim 4, wherein the bending sensor is a piezo-electric element.

17. A device according to claim 4, wherein the bending sensor is a piezo-electric film.

* * * * *